(No Model.)

G. H. RICH.
SAW JOINTER.

No. 451,235. Patented Apr. 28, 1891.

Witnesses:
Charles Shewey
Ayard Lundren

Inventor:
George H. Rich,
By his attys
Wiles Greene & Bitner

UNITED STATES PATENT OFFICE.

GEORGE H. RICH, OF CHICAGO, ILLINOIS.

SAW-JOINTER.

SPECIFICATION forming part of Letters Patent No. 451,235, dated April 28, 1891.

Application filed September 1, 1890. Serial No. 363,629. (No model.)

*To all whom it may concern:*

Be it known that I, GEORGE H. RICH, a citizen of the United States of America, residing at Chicago, in the county of Cook and State of Illinois, have invented certain new and useful Improvements in Saw-Jointers, of which the following is a specification.

My invention relates to a device commonly termed a "saw-jointer," which is used to even up the teeth of a saw prior to sharpening the same, and after the saw is sharpened and set to gage the teeth to a common width by filing off the sides of the same.

Figure 1:
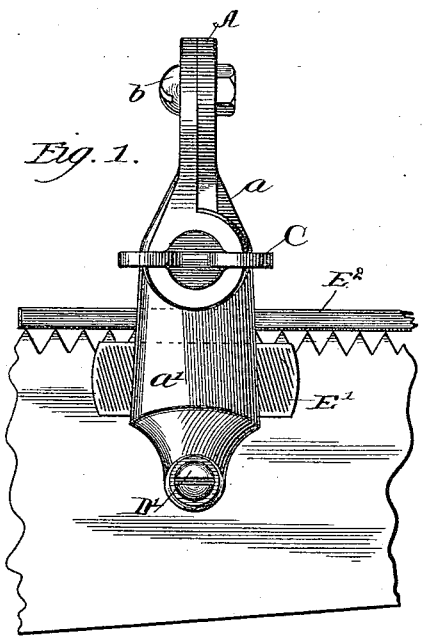
Figure 2:
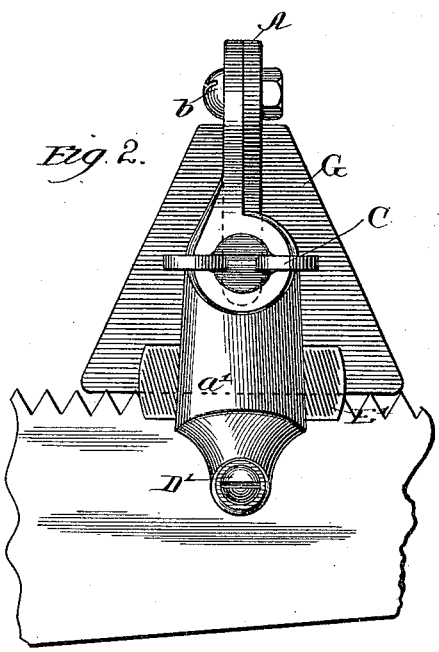
Figure 3:
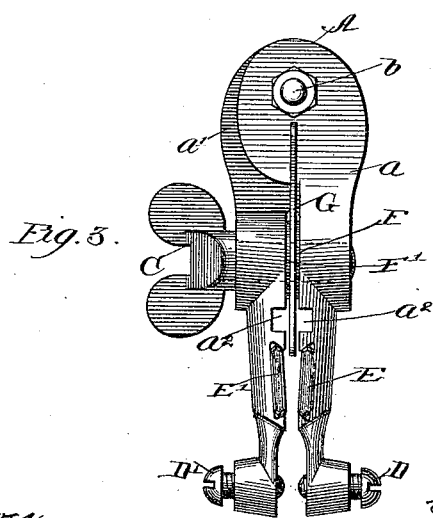

This device is shown in the drawings by means of three figures, Figure 1 being a side view of the same arranged for evening up the teeth of the saw before filing, and showing a fragment of the saw in position for this operation. Fig. 2 is a similar view of the same device adapted to filing the sides of the teeth, to gage them to an even width, and also shows a portion of the saw in place. Fig. 3 is an end view, without the saw, of the same device as shown in Fig. 2.

When a saw is sharpened by means of a file and then set, it is impossible to bend the teeth with sufficient accuracy to give the saw an even cut from end to end. On the other hand, if the cut is not even, being wider at one portion than at another, the saw will stick at the wider portions, and even if crowded through by the exertion of unnecessary force will leave a ragged and uneven surface. It is hence necessary to gage the teeth of the saw to an approximately even width from end to end. This has been attempted heretofore by means of a single file mounted in a block, so that as it is passed back and forth along the side of the saw-blade the file will cut away the sides of the teeth, being meanwhile kept at a predetermined distance from the plane of the saw-blade by the block in which it is mounted and certain adjusting devices applied thereto. This has been found fairly satisfactory when the saw-blade is of the same thickness throughout; but when, as is generally the case, it is thicker at one portion than at another, tapering, as in the case of a hand-saw, from the handle to the point, the teeth made even by means of such a device will have the same taper as the saw-blade, and while such teeth may remain sharp longer than if they had not been evened up at all, yet the saw does not run much easier nor make a much smoother cut. My main improvement is intended to remove this difficulty, and to such end consists in the combination of two files mounted in a suitable handle and adapted to embrace the saw-teeth between them, thus dertermining the width of the set entirely independent of the thickness of the saw-blade, and governing it solely by the adjustment of the handle.

A second feature of my invention consists in adapting the handle before referred to to the holding of a file for evening up the teeth before sharpening, and in addition to these there are other minor improvements, all of which will be hereinafter fully described and claimed.

Describing the preferred construction, which is shown in the drawings, by means of the reference-letters applied thereto, the handle or frame A is composed of two parts $a\ a'$, pivoted at $b$, and adjusted toward or from each other by the thumb-screw C. These two parts or arms are designed to receive the saw between them, and to steady it there they have at their free ends two screws D D'. A short distance above these two screws two files E E' are mounted in a suitable manner, and preferably arranged so as to be nearer together at the bottom than at the top. The thumb-screw C, as shown in the drawings, passes through the arm $a'$ of the handle and is threaded in the other arm $a$. Between them it carries two spring-washers F F', which, when not under compression, keep the arms at a slight distance apart. The inner sides of the arms $a\ a'$ bear grooves $a^2$ preferably between the files and the thumb-screw C. These grooves are shown as empty in Fig. 3. They are designed, however, to hold a file to be used in evening up the points of the teeth before sharpening the saw. This file is shown in position in Fig. 1, and is lettered $E^2$. In performing this operation the file $E^2$ is tightly clamped in the grooves $a^2$ by means of the thumb-screw C, and should be of sufficient width to keep the arms $a\ a'$ far enough apart to receive the saw-blade between them without allowing the files E E' to touch its surface. The jointer is then placed over the saw in the position shown in Fig. 1 and passed back and forth until the file E² cuts down the teeth to the same level. After the saw has been filed and set to gage the teeth to a common width the file E² is removed and a plate G, slotted, as shown in dotted lines in Fig. 2, is slipped over the screw C between the washers F F, preferably extending upward far enough to embrace the flat portions of the arms $a\ a'$. The jointer is now placed upon the saw, as shown in Fig. 2, the blade G resting upon the teeth, and adjusted so as to bring the files E E' even with the latter. The files are then brought up against the teeth and adjusted to the width desired by means of the thumb-screw C. They are then passed back and forth over the saw until all of the projecting teeth are brought down to this width. As before stated, the files E E' are farther apart at the top than at the bottom. They are thus arranged to enable them to cut farther back upon the sides of the teeth, and so produce a sharper point than would otherwise be possible. The adjustable plate G adapts the jointer to use upon saws having any length of teeth.

It is hardly necessary to say that an oilstone or one manufactured from emery or any other equivalent device may be employed in place of the files spoken of herein. The handle also of the jointer and the different adjusting devices applied thereto are capable of great variation, and I do not limit my main improvements to any specific form, but—

I claim as new and desire to secure by Letters Patent—

1. The combination of the handle A, composed of the pivoted parts $a\ a'$, files E E', secured thereto, a spring interposed between said pivoted parts and tending to separate them, and a clamping-screw by means of which they may be forced together against said spring, substantially as described.

2. The combination of a handle A, composed of pivoted parts $a\ a'$, containing grooves $a^2$ in their adjacent surfaces, adapted to receive a file, as $E^2$, a spring interposed between the parts $a\ a'$, tending to separate them, and a clamping-screw by means of which they may be forced together against said spring, substantially as described.

3. The combination of the handle A, composed of the pivoted parts $a\ a'$, the files E E', secured to the adjacent surfaces of said parts, the guiding-screws D D', the spring-washers F, the plate G, and the screw C, substantially as described.

GEO. H. RICH.

Witnesses:
H. BITNER,
CHARLES SHERVEY.